Sept. 28, 1943.                J. MORKOSKI                 2,330,302
                          TRACTOR MOUNTED IMPLEMENT
                 Filed April 18, 1941           2 Sheets-Sheet 1

INVENTOR
JAMES MORKOSKI
BY Paul O. Pippel
  ATTY

INVENTOR
JAMES MORKOSKI
BY Paul O. Pippel
ATTY

Patented Sept. 28, 1943

2,330,302

UNITED STATES PATENT OFFICE 2,330,302

TRACTOR-MOUNTED IMPLEMENT

James Morkoski, Canton, Ill., assignor to International Harvester Company, a corporation of New Jersey Application April 18, 1941, Serial No. 389,216

5 Claims. (Cl. 97—189)

This invention relates to tractor-mounted implements of a type having a tool beam extending under the body portion of the tractor, and more particularly it relates to gauge wheel attachments adapted for connection to the tool beam.

It is an object of the present invention to provide a gauge wheel means for a plow beam adapted to extend under the body of the tractor and movable vertically to and from a working position, wherein the gauge wheel, located directly under the body of the tractor, is permitted to slump when the tool beam is raised out of its working position, so that the gauge wheel will not in any way impede the vertical movement of the tool beam.

It is another object of the invention to provide a gauge wheel means of this type having lost motion, which is a self-contained unit and, as such, is attachable to the tool beam.

It is another object of the invention to provide, in a self-contained gauge wheel attachment having lost-motion means, means wherein the same can be adjusted to vary the working depth of the tool.

It is another object of the invention to provide in a self-contained unit a combination lost-motion and adjustable means wherein the same is of simple and compact construction, and wherein the parts thereof will not interfere with the body portion of the tractor either when the beam is in its working position or when the same is moved to a transport position.

According to the present invention, there has been provided a gauge means which is so connected to the tool beam that it will slump as the tool beam is raised. This is accomplished by the gauge means being connected by means of a lost-motion connection with a bracket which is in turn connected to the tool beam. The gauge means and the bracket and the lost-motion means between the gauge means and the bracket form a self-contained unit and, as such, is attachable to the tool beam. The bracket is provided with a sleeve bearing in which is journaled the crank arm carrying the gauge wheel. This crank arm is in turn connected with a frame portion on the brackets by means of a lost-motion connection adapted to permit the wheel to slump a certain amount as the tool beam and gauge means are raised. The lost-motion connection means includes as well an adjustable stop which regulates the working position of the gauge means. As the tool beam and gauge means are lowered, the gauge means will always assume a position relative to the tool beam depending upon the adjusting of the adjustable stop.

For other objects and for a better understanding of the invention, reference may be had to the following detailed description taken in connection with the accompanying drawings, in which.

Figure 1:
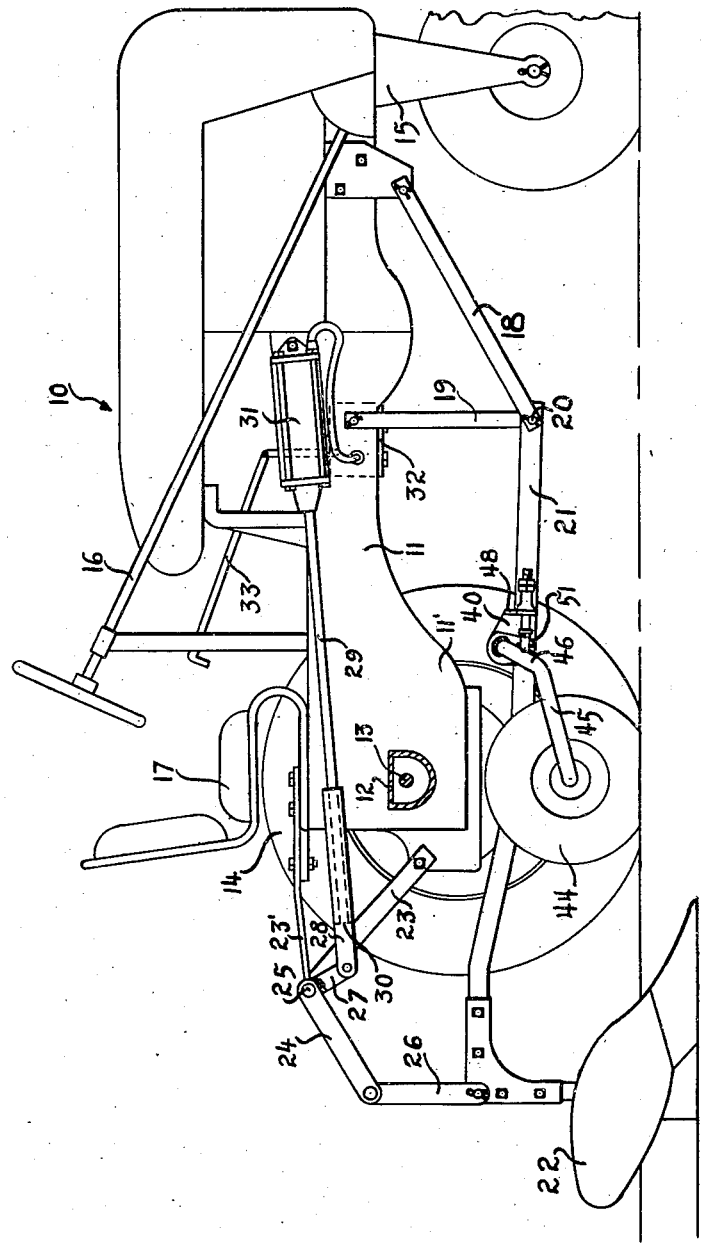
Figure 1 is a view in elevation of a tractor and of the implement having the gauge wheel attachment connected thereto, the working tool being lowered to its working position.

Referring now to the figures, there is shown a tractor 10 having a body portion 11, which includes a transversely extending axle structure 12 with an axle 13 running therethrough for connection to a tractor drive wheel 14. The forward portion of the tractor is supported on a steerable bolster structure 15 adapted to be operated by steering mechanism 16 from an operator's station 17 on the rear axle structure 12. Intermediate the rear axle structure and the steerable wheel structure are depending draft members 18 and 19, which unite to form a connection point 20 for the attachment thereto of a longitudinally extending tool beam 21 having a working tool or plow bottom 22 connected to its rear end at a location in rear of the rear axle structure of the tractor.

On the rear of the tractor is connected the bracket member 23 which is retained in a vertical position by a brace 23'. This bracket member serves as a support for the lifting means 24 pivotally connected thereto, as indicated at 25. The lifting means 24 is in turn connected with the longitudinally extending tool beam 21 by means of a link 26. Depending from the pivotal connection 25 of the lifting means is an arm 27, to which is connected a sleeve member 28. Into this sleeve member is telescoped a piston rod 29 adapted for abutment with a stop 30 within the sleeve 28. This piston rod is operated by a fluid cylinder device 31 adapted to receive fluid from a fluid supply 32 within the body portion 11 of the tractor. This fluid supply 32 is controlled by a control element 33 accessible to the operator's station 17. When it is desired to lift the working tool 22 to a transport position, the control element 33 is operated and fluid is thus supplied to the cylinder device 31 so as to cause engagement of the piston rod 29 with the abutment 30. This causes clockwise rotation of the lifting means 24 about its pivotal connection and, through the link 26, effects a lifting or vertical movement of the working tool 22 about its pivotal connection 20.

Figure 2:
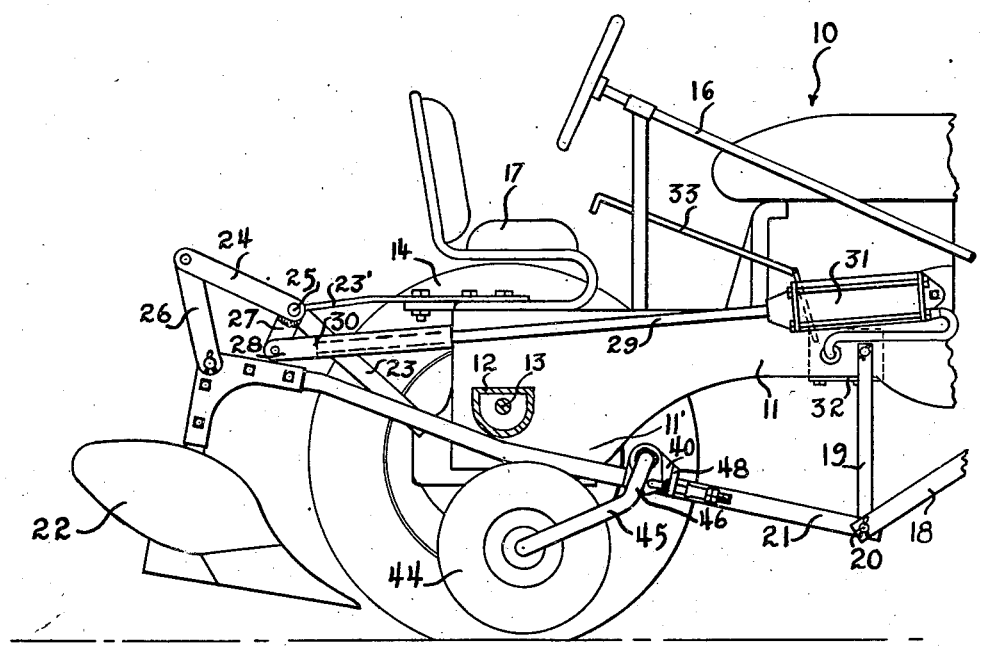
Figure 2 is a view similar to Figure 1, but showing the implement and gauge means raised to their transport position, the lost-motion connection between the gauge wheel and its brackets having been taken up; and, Figure 3 is an enlarged plan view of the gauge means connected to the longitudinal beam.
Figure 3:
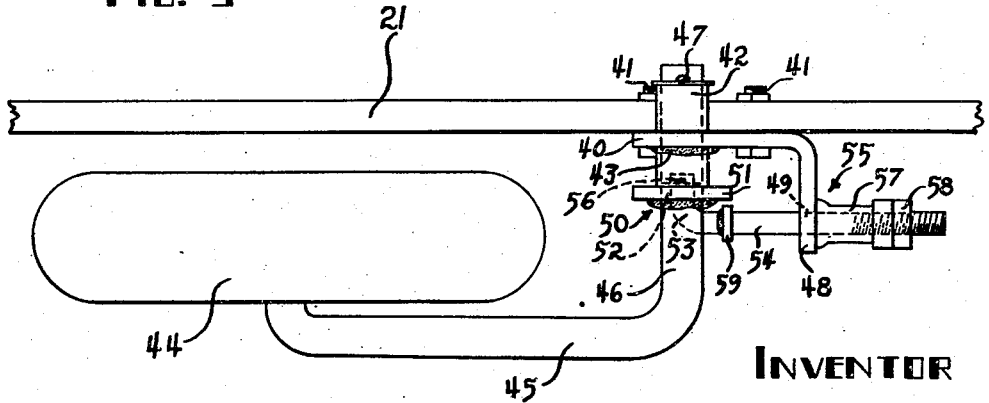

The tool beam will then assume a position shown in Figure 2. Since the tool beam extends rearwardly from its pivotal connection 20, and to the side of a central depending portion 11' of the body portion 11, the beam can be raised as high as the transverse structure 12, providing there is no structure carried by the tool beam which might project above the beam and contact with the rear axle structure prior to the beam coming into contact with the rear axle structure. It so happens that the best location for the gauge wheel is on the unplowed ground and immediately ahead of the working tool 22. This location appears to be immediately beneath the body portion of the tractor. With this type, if the usual gauge wheel attachment is used, the beam would be stopped in its vertical movement at a time prior to obtaining sufficient height of the working tool above the ground.

According to the present invention, there has been provided a gauge wheel attachment for permitting the location of the gauge wheel immediately beneath the transverse axle portion of the tractor and hence one which will not interfere with the vertical movement of the tool beam upon the same being moved to its transport position. This attachment includes a bracket structure 40 having a flat faced portion adapted to engage with the side of the tool beam 21 to be retained there by attaching bolts 41. This bracket structure extends to a location above the tool beam 21 and carries a sleeve 42 extending laterally across the top face of the beam 21. This sleeve is welded, as indicated at 43, to the bracket structure 40. A gauge wheel 44, forming a part of the attachment, is positioned at a location rearwardly of the bracket structure 40 on the tool beam and immediately beneath the transverse axle structure 12. The gauge wheel 44 is connected to the bracket structure 40 by means of a crank arm 45 having a transversely extending portion 46 journaled in the sleeve 42. The axle portion 46 is held in the sleeve against lateral movement by a cotter pin 47.

The bracket structure 40 is provided with a laterally extending portion 48 having a longitudinally extending opening 49 therethrough. Welded to the axle portion 46, as indicated at 50, is a downwardly depending arm 51 having a hole 52 therein. Extending into this hole 52 is a transversely extending portion 53 of a link 54 forming a part of a lost-motion means, indicated generally at 55. The transverse portion 53 is retained in the opening 52 by a cotter pin 56. The forward end of the link 54 extends through the opening 49 in the portion 48 of the bracket structure and has threaded on its outer end an adjustable stop element 57 adapted to be screwed along the length of the link and to be retained in any position thereon by a lock nut 58. When the working tool 22 is in its ground position, as shown in Figure 1, the adjustable stop 57 will abut the forward face of the frame portion 48 to thereby prevent clockwise rotation of the crank arm with respect to the general journal connection with the bracket structure 40. By adjusting the adjustable stop, the working depth of the plow 22 is regulated. Intermediate the connection of the link 54 with the arm on the axle portion 46 and the frame 48, there is welded on the link 54 a stop washer 59. This stop washer 59, as the tool beam is raised, will finally engage the bracket portion 48, and the gauge wheel 44 will be lifted by the beam 21. Since the lifting of the gauge wheel 44 does not take place until after some movement has been given to the tool beam, the gauge wheel may be said to slump as the tool beam is raised. The effect of this slump of the gauge wheel 44 is sufficient to prevent the same from contacting with the transverse rear axle structure 12 as the tool beam is raised to its transport position, as shown in Figure 2. The amount of this slumping movement will always be the same, since the washer 59 is made rigid with the link 54, but the amount of upward or clockwise movement of the gauge wheel as the plow is lowered into its plowing position is dependent upon the setting of the adjustable stop element 57. It should thus be apparent that there has been incorporated in a lost-motion link means an adjustable stop wherein the gauge wheel may be adjusted. As the adjustable stop 57 is screwed inwardly, the working depth of the working tool 22 is decreased, whereas, if it is screwed outwardly and forwardly, the working depth of the working tool 22 would be increased, since, by doing the latter, the gauge wheel when in contact with the ground will be rotated in a clockwise direction about the pivotal connection with the bracket 40. It will also be noted that, by having the link means connected to a depending arm and by alining a portion of the bracket structure 40 at the same height above the ground, the link means may extend substantially in a horizontal plane and coextensively with the tool beam 21. There is an advantage in having the link means extend coextensive with the tool beam in that it will not interfere with the vertical movement of the beam, should there be some projection on the tractor which might be contacted by the same upon the beam being moved vertically.

It should now be apparent that there has been provided a gauge wheel attachment having a lost-motion connection means and a depth-adjusting means, which is a self-contained unit and adaptable for attachment to a working tool beam. It should also be clear that there has been provided a gauge means adaptable for attachment to a tool beam which extends beneath the body portion of the tractor, and one which will not interfere with the vertical movement of the tool beam upon the same being raised to a transport position.

While various changes may be made in the detail construction of the present invention, it shall be understood that such changes shall be made without departing from the spirit and scope of the present invention as defined by the appended claims.

What is claimed is:

1. A self-contained gauging attachment adapted for connection to a plow beam, comprising a gauging element, a bracket adapted for attachment to a plow beam, means for connecting the gauging element to the bracket for vertical movement with respect thereto, and lost-motion means connected between the element connecting means and the bracket to permit a certain amount of upward movement of the plow beam prior to vertical movement of the gauging element.

2. A self-contained gauge wheel attachment adapted for connection to a plow beam, comprising a gauge wheel, a bracket adapted for attachment to the plow beam, arm means for pivotally connecting the gauge wheel to the bracket for vertical movement, and lost-motion means connected between the arm means and the bracket to permit a certain amount of upward movement of the plow beam prior to vertical movement of the gauge wheel.

3. A self-contained gauging attachment adapted for connection to a plow beam, comprising a gauging element, a bracket adapted for attachment to a plow beam, means for connecting the gauging element to the bracket for vertical movement with respect thereto, and lost-motion means connected between the element connecting means and the bracket to permit a certain amount of upward movement of the plow beam prior to vertical movement of the gauging element, said lost-motion means including an adjustable stop means to limit and vary the position of the gauging element in its gauging position.

4. In a gauge wheel attachment adapted for connection to plow beams, a supporting bracket adapted for attachment to the plow beam and having a journal portion, a gauge wheel, a crank arm for attaching the gauge wheel to the supporting bracket including a portion journaled in the journal portion, and lost-motion means for connecting the crank arm to the bracket to permit limited vertical movement of the bracket and plow beam without movement of the gauge wheel when the plow beam is raised.

5. In a gauge wheel attachment adapted for connection to plow beams, a generally longitudinally extending supporting bracket adapted for attachment to the side face of a plow beam, said supporting bracket having an attaching portion, and a journal sleeve portion which is adapted to extend transversely of the beam, a gauge wheel, crank means for attaching the gauge wheel to the supporting bracket including a transverse axle portion journaled in the journal sleeve portion of the bracket and an arm portion angled with respect thereto and adapted to extend longitudinally at the side of the beam, means on the bracket extending transversely from its attaching portion, an arm depending from the axle portion of the crank means, and link means for limiting the vertical movement of the gauge wheel extending between the depending arm and the transverse means of the bracket, whereby the limiting means is arranged to run coextensive with the plow beam.

JAMES MORKOSKI.